(12) United States Patent
Frantti

(10) Patent No.: US 7,174,181 B2
(45) Date of Patent: Feb. 6, 2007

(54) POWER CONTROL METHOD AND TELECOMMUNICATIONS SYSTEM

(75) Inventor: Tapio Frantti, Oulu (FI)

(73) Assignee: Valtion teknillinen tutkimuskeskus, Espoo (FI)

( * ) Notice: Subject to any disclaimer, the term of this patent is extended or adjusted under 35 U.S.C. 154(b) by 451 days.

(21) Appl. No.: 10/400,674

(22) Filed: Mar. 28, 2003

(65) Prior Publication Data
US 2004/0002353 A1 Jan. 1, 2004

(30) Foreign Application Priority Data
Mar. 28, 2002 (FI) ................... 20020610

(51) Int. Cl.
*H04B 7/00* (2006.01)
*H04Q 7/20* (2006.01)

(52) U.S. Cl. .............. 455/522; 455/450; 455/452; 370/336; 370/442; 370/458

(58) Field of Classification Search ........... 455/522, 455/422.1, 450, 451, 452, 509; 370/336, 370/442, 458, 294, 329, 337, 345, 277, 280, 370/465; 375/240, 241
See application file for complete search history.

(56) References Cited

U.S. PATENT DOCUMENTS 5,751,763 A * 5/1998 Bruckert ............ 375/141
6,381,229 B1 * 4/2002 Narvinger et al. ......... 370/328
6,445,930 B1 * 9/2002 Bartelme et al. .......... 455/522
6,535,497 B1 * 3/2003 Raith ................. 370/336
6,590,878 B1 * 7/2003 Uchida et al. ........... 370/330

FOREIGN PATENT DOCUMENTS

| EP | 0 993 213 A1 | | 4/2000 |
|---|---|---|---|
| GB | 2 341 294 | | 3/2000 |
| GB | 2 341 294 A | * | 3/2000 |
| GB | 2 358 327 A | | 7/2001 |
| WO | 00/62441 | | 10/2000 |
| WO | 00/64071 | | 10/2000 |
| WO | 00/74261 | | 12/2000 |
| WO | 01/01599 | | 1/2001 |
| WO | 02/054620 A1 | | 7/2002 |

* cited by examiner

*Primary Examiner*—Edan Orgad
(74) *Attorney, Agent, or Firm*—Young & Thompson

(57) ABSTRACT

The invention describes a method of controlling transmission power in a telecommunications system comprising a first and a second transceiver. In the presented method, one power control command is transmitted during at least two time-slots from the second transceiver to the first transceiver and the one power control command is received at the first transceiver during at least two time-slots.

19 Claims, 2 Drawing Sheets

POWER CONTROL METHOD AND TELECOMMUNICATIONS SYSTEM

FIELD

Figures 1, 2:
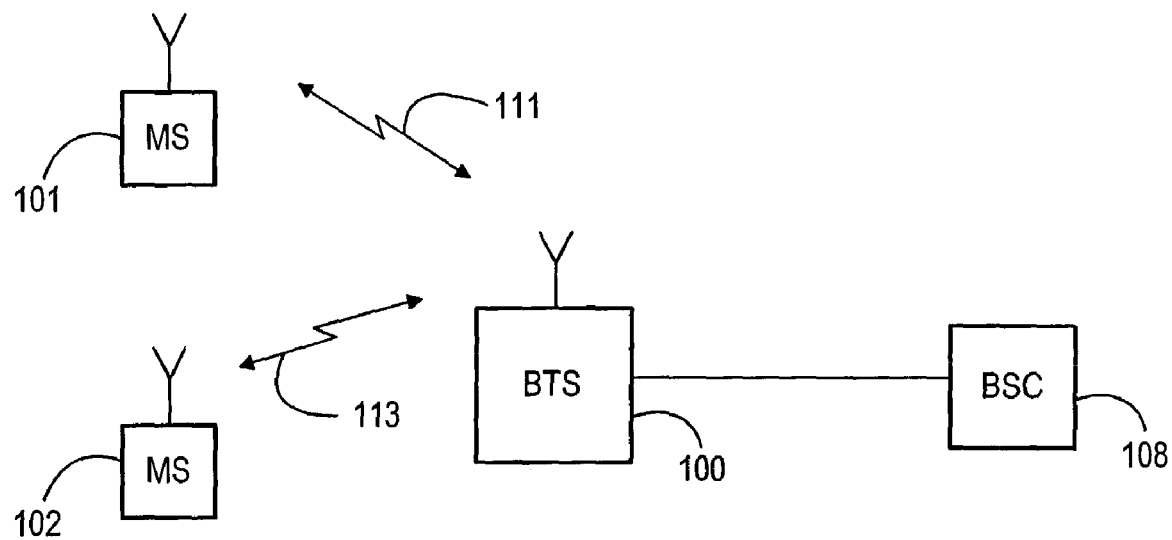

The invention relates to a method of controlling transmission power in a telecommunications system, and to a telecommunications system.

BACKGROUND

In telecommunications systems, power control is important for the prevention of signal fading, shading, near-far problems and co-channel interference. Power control is particularly necessary in situations in which system users are located both near and far from a base station. Signals should arrive at the base station receiver with equal power or else the signals arriving with a lower power would be covered by the higher-power signals. Transmitters located far away should thus transmit the signals at a higher power than transmitters close to the base station. In addition, the signals should be transmitted at an as low power level as possible that would, however, be sufficient to meet the quality requirements set for the signals.

In prior-art CDMA systems (e.g. IS-95, CDMA-PCS, UMTS, CDMA2000), the transmission power of the terminal and base station is controlled for instance by first measuring the signal-to-interference ratio of the transmitted signal and determining by means of it and other reference values a power control command for adjusting the transmission power at each time. The terminal increases or decreases its transmission power according to instructions provided by the base station in accordance with the power control commands it receives in each time-slot. In the IS-95, CDMA-PCS and CDMA2000 systems, there are two power control commands: increase and decrease. In the UMTS system, there are three (in theory four) power control commands: increase, decrease and maintaining the power. In the base station, a reference level is determined for instance on the basis of the ratio between bit energy and interference energy and the bit error rate, and the reference level is used to control power, i.e. to increase or decrease power as necessary. The base station then transmits to the terminal a command to either increase or decrease transmission power, whereby the terminal increases or decreases its earlier transmission power level by a predefined quantity, usually one or two decibels at a time.

Drawbacks with the prior-art solutions include the fact that since power can only be increased by a predefined quantity, generally one or two decibels at a time, with one power control command, it is not possible to react to rapid changes in channel conditions. Such a situation arises in a rapidly fading channel, wherein power should be quickly increased or decreased large quantities at a time to obtain an optimum power level. A problem with the prior-art solutions is thus a long transmission-power change time, in addition to which, the transmission power level also varies continuously.

BRIEF DESCRIPTION

It is an object of the invention to implement a method and a telecommunications system implementing the method in such a manner that the problems related to the prior art are reduced. This is achieved by a method of controlling transmission power in a telecommunications system comprising a first and a second transceiver. The method of the invention comprises transmitting one power control command during at least two time-slots from the second transceiver to the first transceiver and receiving said one power control command in the first transceiver during at least two time-slots.

The invention also relates to a telecommunications system comprising a first and a second transceiver. In the telecommunications system of the invention, the second transceiver is configured to transmit one power control command during at least two time-slots to the first transceiver and the first transceiver is configured to receive said one power control command during at least two time-slots.

Preferred embodiments of the invention are set forth in the dependent claims.

The method and system of the invention provide several advantages. An optimum transmission power level is achieved quickly. With the method of the invention, it is possible to stabilize the received power level, reduce harmonics and speed up the change of the transmission power. The performance of the telecommunications system also increases. In addition, the power consumption of terminals decreases and their operating life becomes longer.

LIST OF FIGURES

Figure 3A:
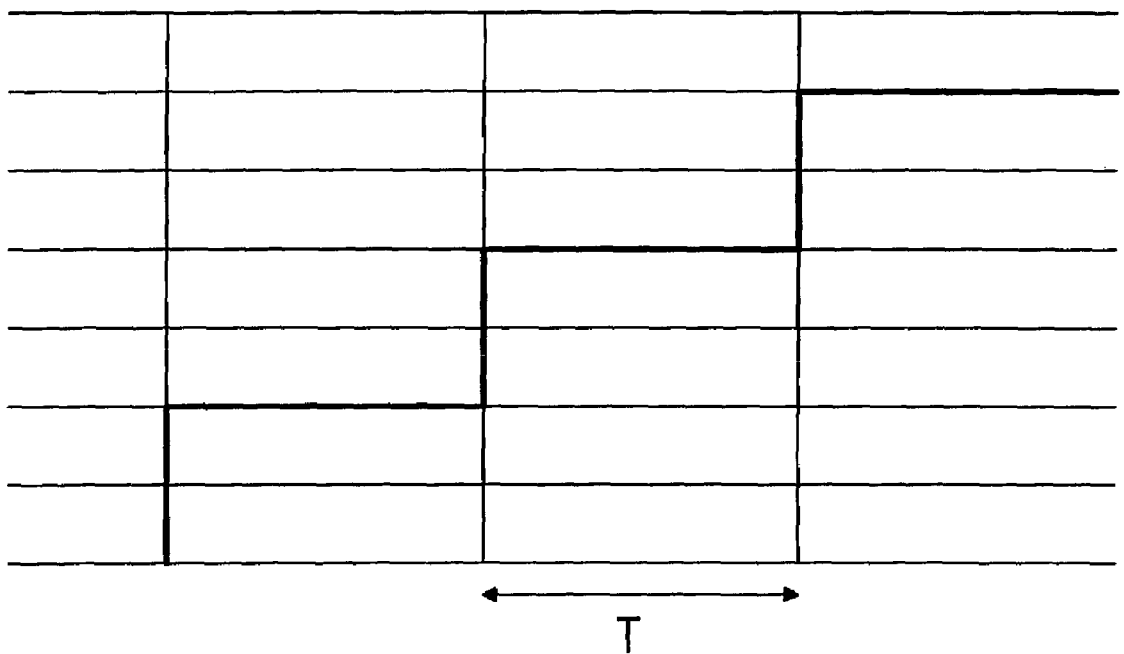
Figure 3B:
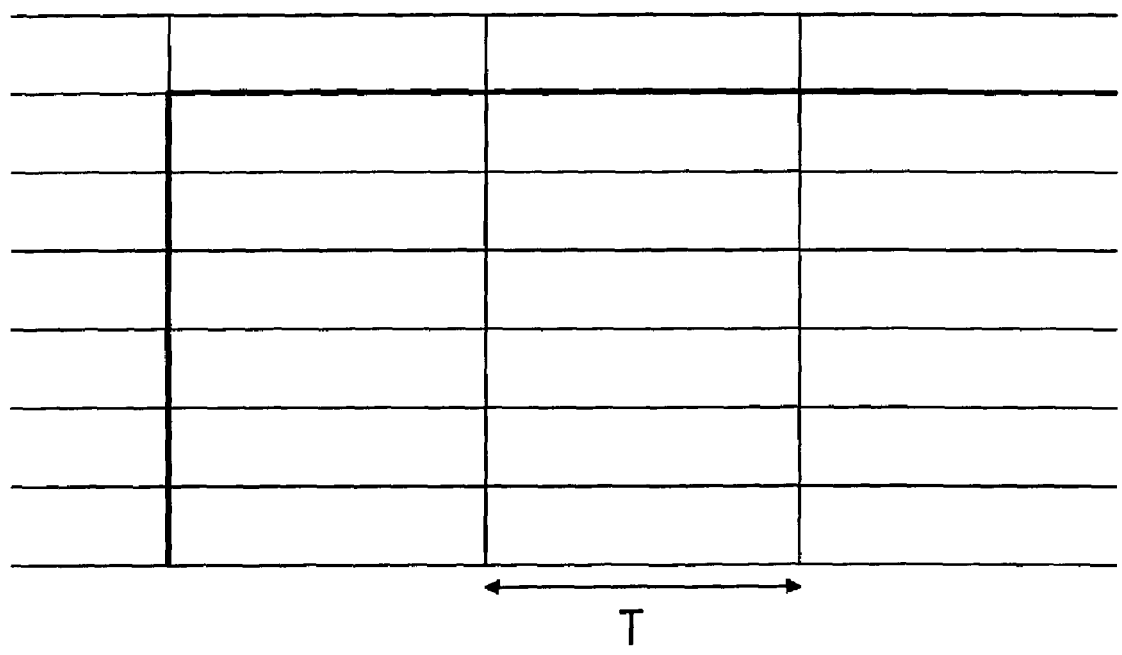

The invention will now be described in greater detail by means of preferred embodiments and with reference to the attached drawings, in which FIG. 1 shows an example of a telecommunications system according to the presented solution, FIG. 2 shows a message structure used in a telecommunications system, FIG. 3A shows a working example of power control according to the prior art, FIG. 3B shows a working example of power control according to the presented solution.

DESCRIPTION OF THE EMBODIMENTS

The presented transmission power control solutions can be applied to telecommunications systems. One such telecommunications system is the broadband WCDMA radio system that utilizes spread-spectrum data transfer. In the following, embodiments are described by using WCDMA radio systems as examples, without being restricted to them, however, as is apparent to a person skilled in the art.

The preferred embodiments of the invention can be applied to WCDMA radio systems, for instance, that comprise one or more base stations and a group of terminals that communicate with one or more base stations. One of the most important functions of the devices in a WCDMA-based radio system is transmission power control. As the distance grows or multipath fading occurs, the strength of the signal also attenuates and a mobile terminal located close to the base station or one transmitting a stronger signal covers the signals of terminals further away. The terminals must adjust their transmission power in such a manner that the signals arriving at the base station are as equal as possible in power.

The structure of the radio system can essentially be as shown in FIG. 1. The radio system comprises a base station 100 and a group of terminals 101, 102 that have a bidirectional connection 111 to 113 to the base station 100. The base station 100 transmits the connections of the terminals 101, 102 to a base station controller 108 that transmits them on to other parts of the system or to a fixed network.

The base station 100 contains at least one transceiver. The transceiver can implement for instance 90 physical channels on each carrier wave. Of the physical channels of the radio system air interface, general and dedicated control channels are the ones associated with the connections between the base station and terminals. Dedicated connections are needed especially to achieve an optimum performance in maintaining several channels. Dedicated channels comprise, among other things, transmission power control commands for the adjustment of transmission power. One frame in a dedicated carrier wave can comprise for instance 15 time-slots with two bits reserved for power control in each time-slot.

A transceiver of the presented solution can be the base station 100 or the terminal 101, 102. Usually, one base station 100 serves one cell, but it is also possible to have one base station 100 serve several sectors of one cell. The base station 100 not only comprises the electronics required to transmit and receive radio traffic, but also signal processors, ASICs and general processors that take care of data transmission to the base station controller 108 and control the operation of the base station 100.

The base station controller 108 controls the operation of one or more base stations. The base station controller 108 monitors, among other things, the quality of the radio signal, the transmission power, and takes care of inter-cell or inter-sector handovers. The terminal 101, 102 contains at least one transceiver, with which a radio connection to the base station is implemented. In addition, the terminal 101, 102 contains an antenna, user interface and battery.

The transmission power level measurement of the prior art is performed in the base station 100 of the telecommunications system, for instance, and the results are transmitted back to the terminal 101, 102 so that it can adjust its power level. This can also be done in reverse in such a manner that the terminal 101, 102 measures the power level and the base station 100 adjusts its transmission power. The signal-to-interference ratio of the received signal is for instance measured for each time-slot and on the basis of the measurement, it is determined whether to increase or decrease the transmission power at the other end. The control bits of the transmission power form the power control command in each time-slot and the transmission power adjustment is done on the basis of the received power control command. In cdmaOne systems, for instance, one bit is used for power control for adjusting the power up or down by usually one decibel at a time. UMTS-systems use two bits for power control, whereby the power can be adjusted one fixed step up or down at a time or kept as is.

In the situation of FIG. 1, the transmission power control of the prior art takes place for instance in such a manner that first signals are transmitted from the terminal 101 to the base station 100. Next, the base station 100 compares the received signals with a preset nominal level for the purpose of forming a power control command, after which the power control command is transmitted in each time-slot of the message structure of the radio system from the base station 100 to the terminal 101. Then, the terminal 101 adjusts its transmission power on the basis of the received power control command.

Next, the method of adjusting transmission power is described using FIG. 1. In the presented solution, one power control command is transmitted during at least two time-slots from the base station 100 to the terminal 101 and said one power control command is received at the terminal 101 during at least two time-slots.

In the presented solution, signals are thus first transmitted from the terminal 101 to the base station 100. Next, the base station 100 compares the received signals with a preset nominal level for the purpose of forming a power control command, after which the base station 100 transmits the power control command to the terminal 101. In the presented solution, the arrangement functions in such a manner that the power control command is not transmitted in one time-slot. Instead, one power control command is transmitted during at least two time-slots, whereby the power control bits in the formed power control command are divided over a total of two different time-slots, for instance. In other words, in one presented solution, the arrangement functions in such a manner for instance that the power control bits of two different time-slots form one power control command. In the described example, the terminal 101 can for instance receive a power control command in every second time-slot. The received power control command can then comprise for example altogether four power control bits. When the power control command has been received at the terminal 101, the transmission power of the terminal 101 is adjusted on the basis of it. Since it is now possible to use for instance four bits to communicate the power control command instead of the earlier two bits, transmission power can be adjusted at one time by as many as seven different-sized steps up or down, or power can be adjusted more accurately.

In the presented solution, it is also possible that the base station 100 does not transmit the power control command in each time-slot. Instead, the base station 100 transmits the power control command in every second time-slot, for instance. This power control command transmitted in every second time-slot comprises for instance the power control bits of altogether two time-slots, whereby the terminal 101 can adjust its transmission power by as many as seven steps up or down on the basis of the power control command received in one time-slot. According to the presented solution, the base station 100 transmits power control commands in predefined time-slots, for instance in every nth time-slot, wherein n is at least two, in such a manner that the power control command is placed in m time-slots, wherein m at least one or at most n. In the presented solution, the number of power control bits of the power control command transmitted in different time-slots may vary. It is then possible to give power control bits for other use in the radio system in the time-slots, in which no power control bits are transmitted. Correspondingly, in the time-slots, in which for instance four power control bits are transmitted instead of the usual two, it is possible to take the necessary two extra bits from the bits reserved for other than power control and use them for the transmission of the power control command.

Let us next examine one presented example by means of FIG. 2. FIG. 2 shows a message structure used in a telecommunications system, comprising time-slots 200 to 210 (horizontal lines) and ten bit-combinations in each time-slot 200 to 210. Part of the ten bit-combinations in each time-slot 200 to 210 is reserved for power control. In cdmaOne systems, for instance, one bit is reserved for power control, which means that one power control command can adjust power by one step up or down. In UMTS systems, two bits are used for power control, which means that each power control command can adjust power by two steps up or down.

As shown in FIG. 2, known solutions have two bits reserved for power control in each time-slot 200 to 210. One power control command thus comprises two bits. According to the prior art, these two bits are transmitted in each of the time-slots 200 to 210, whereby the frequency becomes 1600 Hz, for instance. In FIG. 2, the power control command comprises for instance bits 12 and 13 in each time-slot 200, bits 22 and 23 in time-slot 202. According to the prior art, the power control command is received in each time-slot 200 to 210 and thereafter, the transmission power is adjusted by means of the received two-bit power control command.

In the presented solution, the power control bits 12 and 13 transmitted in time-slot 200 are not read separately as one power control command, but one power control command is made up of the power control bits 12 and 13 together with the power control bits 22 and 23 of the second time-slot 202. Thus, the second time-slot 202 has a power control command comprising altogether four bits 12, 13, 22, 23. The power control command formed by the power control bits of two different time-slots 200 to 210 that now comprises four bits is received during every second time-slot, for instance. This way, it is possible to significantly improve power control with the method, because a four-bit power control command, for instance, makes it possible to increase or decrease transmission power seven steps at a time. The method improves stability in the radio system, because the absolute size of error can now be taken into account instead of the predetermined size of error. For instance, if the required power control change was seven steps, the change could be made at one time according to the presented solution. The prior art, in turn, does not allow such a change at one time with one power control command, but requires several consecutive power control commands.

If each time-slot 200 to 210 comprises for instance two power control bits, the power control command is made up of the power control bits of two consecutive time-slots, such as 200 and 202. Let us mark such a situation with the number combination 2,2, in which the first figure is the number of power control bits in time-slot 200 and the second figure is the number of power control bits in time-slot 202. It is also possible that only one power control bit is transmitted in time-slot 200 and three power control bits in the next time-slot 202, which situation is marked with the numbers 1,3. It is also possible not to transmit any power control bits in time-slot 200 and transmit altogether four power control bits in time-slot 202. This is marked with the numbers 0,4.

The presented solution can thus also be implemented in such a manner that in given time-slots, such as time-slot 200, the power control bits 12, 13 are not used. The unused bits 12, 13 can then be given up for other purposes in the radio system. Correspondingly, another time-slot, such as time-slot 202, can use bit positions intended originally for other use owing to the fact that time-slot 200 gave up some of its bit positions. Thus, four power control bits 22 to 25, for instance, are transmitted in time-slot 202 at one time. Because time-slot 202 originally has only two power control bits 22, 23, this provides another two power control bits 24, 25 for use owing to the fact that time-slot 200 gave up its bit pair 12, 13. The power control command, which now comprises four bits 22 to 25, again makes it possible to increase or decrease by as many as seven steps at one time the transmission power of the transceiver that received the power control command.

If each power control command comprises a total of four power control bits, it is for instance possible to transmit four power control bits in every second time-slot 200, 204, 28 and no power control bits in the rest of the time-slots 202, 206, 210. This situation can be marked with the numbers 4,0. This can also be implemented in reverse in such a manner that no power control bits are transmitted in every second time slot 200, 204, 208 and four power control bits are transmitted in each of the remaining time-slots 202, 206, 210. Let us mark this with the numbers 0,4.

If each power control command comprises for instance a total of six power control bits, the number of different options increases further. Each time-slot 200 to 210 could then comprise two power control bits, for instance, and the power control command would be formed as predefined of the power control bits of three consecutive time-slots 200, 202, 204. This can be marked with the numbers 2,2,2. It is also possible to transmit all six power control bits in time-slot 200, in which case no power control bits are transmitted in the two following time-slots 202, 204. This situation is marked with the numbers 6,0,0. With above-mentioned number combinations, it is possible to describe several alternative solutions in a situation, in which the power control command comprises altogether six bits. Solutions of this kind are described by the number combinations 4,2,0; 2,4,0; 0,6,0; 0,0,6; 1,5,0; 1,4,1 and 2,3,1. In the presented solution, it is possible to transmit the power control command in sections having a desired size, for instance in a predefined manner in every nth time-slot, wherein n is at least two.

In the above examples, an average of two power control bits are used for each time-slot. If the power control command to be transmitted is formed in such a manner, for instance, that the number of power control bits in different time-slot varies, it is then possible to free the space required by the power control bits for other purposes in the radio system in the time-slots, in which the number of power control bits is smaller than the average number of power control bits. Correspondingly, in the time-slots, in which the number of power control bits is larger than the average number of power control bits, it is possible to reserve extra power control bits.

Let us next examine the working examples for transmission power control of FIGS. 3A and 3B. In FIGS. 3A and 3B, the x axis shows the used time-slots T and the y axis shows the change in transmission power, which can be one decibel, for instance. FIG. 3A shows a power control example according to the prior art. Since according to the prior art, the transmission power can be increased or decreased by at most two steps during one time-slot, the example of FIG. 3A requires the time of three time-slots to adjust the transmission power by six decibels. FIG. 3B shows power control according to the presented solution. Since it is now possible to increase the transmission power by as many as seven steps at one time, the increase of six steps is already achieved during one time-slot. By comparing FIGS. 3A and 3B, a distinct difference is noted between the prior-art solution and the presented solution. In the presented solution, the desired transmission power increase of six steps is achieved faster than before.

In the above solutions, the prior-art transmission frequency decreases according to the number of time-slots forming the power control command, i.e. formula f/n, wherein f is the transmission frequency and n is the number of time-slots required to transmit one power control command.

Even though the invention has been explained in the above with reference to examples in accordance with the accompanying drawings, it is apparent that the invention is not restricted to them but can be modified in many ways within the scope of the inventive idea disclosed in the attached claims.

The invention claimed is:

1. A method of controlling transmission power in a telecommunications system, comprising:
    a message structure comprising time-slots, the system comprising a first transceiver and a second transceiver,
    the method further comprising controlling the transmission power of the first transceiver (101) based on a received power control command, and dividing one power control command into at least a first part and a second part to be transmitted respectively in at least two time-slots from the second transceiver to the first transceiver, the first part transmitted in a first time-slot and the second part transmitted in a second time-slot, and receiving said one power control command at the first transceiver during at least two time-slots by receiving said first part from said first time-slot and said second part from said second time-slot, combining said first part and said second part to reform said one power control command, and using said reformed one power control command to make a single-increment power adjustment.

2. The method as claimed in claim 1, comprising transmitting one power control command, a n-parts, during n time-slots, wherein n=2, 3, . . . , in such a manner that the power control command is placed in m time-slots, wherein m=2, 3, . . , n.

3. The method as claimed in claim 1, comprising transmitting the power control command in such a manner that the number of power control bits in different time-slots varies.

4. The method as claimed in claim 3, comprising freeing the space required by the power control bits for other use in the time-slots, in which the number of power control bits is smaller than the average number of power control bits.

5. The method as claimed in claim 3, comprising reserving extra power control bits in the time-slots, in which the number of power control bits is larger than the average number of power control bits.

6. The method as claimed in claim 1, comprising transmitting one power control command in every second time-slot.

7. The method of claim 1, wherein, the reformed one power control command has a length of at least 3 bits.

8. The method of claim 1, wherein, the system uses a code division multiple access format with the message structure comprising time-slots and a number of power control bits in each time slot limited to a maximum of two.

9. A telecommunications system, wherein a message structure comprising time-slots is used, the system comprising a first transceiver (101) and a second transceiver (100), wherein the first transceiver (101) is configured to control transmission power based on a received power control command, the second transceiver is configured to divide one power control command into a first part and a second part for transmission respectively in at least two time-slots to the first transceiver, and the first transceiver is configured to receive said first part and said second part and, thereafter upon receipt, reform said received first and second parts into said one power control command during at least two time-slots, wherein, said reformed one power control command is used to make a power adjustment.

10. A system as claimed in claim 9, wherein the second transceiver is configured to transmit one power control command during n time-slots, wherein n=2, 3, . . . , in such a manner that the power control command is placed in m time-slots, wherein m=2, 3, . . . , n.

11. The system as claimed in claim 9, wherein the second transceiver is configured to transmit the power control command in such a manner that the number of power control bits in different time-slots varies.

12. The system as claimed in claim 11, wherein the second transceiver is configured to free the space required by the power control bits for other use in the time-slots, in which the number of power control bits is smaller than the average number of power control bits.

13. The system as claimed in claim 11, wherein the second transceiver is configured to reserve extra power control bits in the time-slots, in which the number of power control bits is larger than the average number of power control bits.

14. The system as claimed in claim 8, wherein the second transceiver is configured to form the power control command on the basis of the signals received by it.

15. The system as claimed in claim 9, wherein the second transceiver is configured to transmit one power control command in every second time-slot.

16. The method of claim 9, wherein, the reformed one power control command has a length of at least 3 bits.

17. The telecommunications system of claim 9, wherein, a code division multiple access format is used and a number of power control bits in each time slot is limited to a maximum of two.

18. A method of controlling transmission power in a telecommunications system, in which a message structure comprising time-slots is used, the system comprising a first transceiver and a second transceiver, the method comprising controlling the transmission power of the first transceiver (101) based on a received power control command, the method comprising the steps of:

dividing one power control command into plural divided command parts so power control bits that make up the one power control command are divided into the plural divided command parts;

transmitting, from the second transceiver to the first transceiver, each divided command part in a different one of at least two time-slots so that different parts of the power control bits that make up the one power control command are transmitted in different ones of the at least two time-slots;

receiving, at the first transceiver during different time-slots, each of the divided command parts and using the received divided command parts to reform the one power control command; and controlling the transmission power of the first transceiver, in a single increment power change, based on the reformed one power control command comprised of the received divided command parts.

19. The method of claim 18, wherein, the reformed one power control command has a length of at least 3 bits.

* * * * *